June 29, 1937.　　　P. J. ROELFSEMA　　　2,085,546
DISTILLATION PROCESS
Filed March 20, 1935

Inventor: Petrus Jurjen Roelfsema
By his Attorney

Patented June 29, 1937

2,085,546

UNITED STATES PATENT OFFICE 2,085,546

DISTILLATION PROCESS

Petrus Jurjen Roelfsema, Walnut Creek, Calif., assignor to Shell Development Company, San Francisco, Calif., a corporation of Delaware Application March 20, 1935, Serial No. 12,007

7 Claims. (Cl. 202—42)

This invention relates to an improved distillation process for the separation of solutions or liquid mixtures of substances having vapor pressures which are the same or almost the same, or which form azeotropic mixtures, and the complete separation of which by ordinary fractionation methods is, for these reasons, extremely difficult and often impossible.

It has already been proposed to employ an extraneous separating agent to aid in the separation of certain mixtures which can not be separated by normal fractionation methods. For example, Brame and Hunter, in the Journal of the Institution of Petroleum Technologists, vol. 13, (1927) page 794, et seq., propose the separation of a mixture of cyclohexane and benzene by distilling it in the presence of ethylene-chlorhydrin, whereby the cyclohexane is caused to distil off and the benzene is concentrated in the residue. In the known modes of operation, the compositions of the distilled azeotropic mixtures often preclude the production of a pure bottom product. No mode of operation has heretofore been proposed for obtaining directly in a single distillation a bottom product which is free or substantially free from the contamination by the component or components of the overhead product.

A further disadvantage of the known modes of operation is that the existence of ternary azeotropic mixtures, which are obtained as overhead mixtures, precludes obtaining a top product which is free of the component desired as a bottom product. In order that the loss of the desired bottom product be kept as low as possible, resort is usually had to a multiple arrangement of apparatus whereby separation of the desired component or components is effected. Not only is a large number of structural units, as recovery columns, separating chambers, scrubbing chambers, condensers, dephlegmators, and the like are required, which occupy a great deal of space and involve a large investment, but a considerable number of heating units is necessitated in order to effect the various separations, thereby depreciating the practicable economy of the process.

As an improvement on such a process, it has been proposed in the copending application of Carney, Serial No. 497,249, filed November 21, 1930, to separate binary mixtures by selecting a separating agent which will not form a ternary azeotrope, or which forms a ternary azeotrope containing only small quantities of the component which is desired as a bottom product. For example, it has been proposed to dehydrate an aqueous alcohol by distilling it with pentane, thereby producing a top product which consists substantially only of water and pentane, and a bottom product which is rich in anhydrous alcohol and usually requires further treatment for removal of remaining water. This process will not, however, generally directly produce pure alcohol, and is, moreover, greatly limited in the choice of separating agents which may be utilized. Thus, many separating agents which form ternary azeotropes containing substantial quantities of alcohol are excluded from the scope of the above mentioned process.

It has also been proposed, as in the patent to Deanesly No. 1,866,800, to effect the separation of butane and butylene by distilling their mixture in the presence of ammonia. However, this patent does not provide a method for controlling the distillation so as to produce substantially pure butylene as a bottom product in a continuous mode of operation.

It is an object of my invention to provide a process of continuous or batch distillation for separating liquid mixtures of the types first described by fractionating the liquid mixture in the presence of a separating agent, which process will permit by means of a single distillation the recovery of a bottom product which is of any desired predetermined purity with respect to the component or components obtained as the top product, regardless of the composition of the binary or ternary azeotropes which may tend to come off the top of the fractionating apparatus.

It is a further object of my invention to provide a process in which the choice of separating agents is not limited to substances which do not form ternary or higher azeotropes.

Other objects of my invention will be apparent from a reading of the following specification.

Briefly, my invention consists of the steps of separating a component A from a component B by distilling a mixture of A and B in the presence of a separating agent C which is a preferential solvent for the component B, and maintaining the ratio of the components A and C in the top product substantially equal to the ratio of A and C in the feed mixture which is introduced into the distillation apparatus. The expression "preferential solvent for B" is, in the present specification and claims, intended to designate solvents which dissolve B in preference to A, i. e., if two solutions, one containing A dissolved in a medium, and the other containing the same concentration of B in the same medium, are separately extracted with such a solvent under identical conditions, the extracted amount of B would be greater than that of A. Often such solvents are referred to as "selective solvents" because of their selective solvent action when a mixture of A and B is brought into contact with such a solvent and an equilibrium is established under conditions producing two liquid phases. In the case of a selective solvent for B which is capable of forming two liquid phases when mixed with a mixture of A and B, the distribution ratio between the selective solvent and the mixture being treated is greater for B than for A. In my process, such a separation into two liquid phases may take place either during the distillation of the mixture of A, B, and C, or, at lower temperatures. By the expression "distribution ratio" as used in the present specification and claims, I mean the ratio of the concentration of a particular component in the phase which is rich in solvent C to its concentration in the phase which is poor in solvent, when a system containing components of the mixture being treated and the solvent C is caused to separate into two liquid phases. Thus, the solvent phase may be said to be used as a reference phase when determining the distribution ratios of components. For example, in the two liquid phase system of hexane-benzene and aniline, the benzene has a higher distribution ratio between the aniline phase and the hexane phase than the hexane has between the two phases; aniline is, therefore, a preferential or selective solvent for benzene. Any or all of the components A, B and C may comprise several separate substances or subcomponents, which, for the purposes of my process, may be regarded as a single component.

The above defined relation between the compositions of the feed and the top product may be effected by either of the following methods:

a. The overhead mixture (vapors leaving the top of the column) or a portion thereof, is treated to withdraw therefrom a top product containing A and C in the ratio in which these components occur in the feed, and the remaining portion of the overhead mixture is returned to the column, either as secondary or added reflux or separately at a different level in the column.

b. The ratio of the components A and C in the feed is adjusted so as to be equal to the ratio of A and C in the overhead, a part of which is then withdrawn as top product in such a manner that reflux and top product have the same composition.

A combination of these methods may also be employed, as by regulating the feed composition to contain A and C in a ratio which is close to the ratio of A and C in the overhead mixture, and treating the overhead to withdraw a top product of the required composition, i. e., a top product containing A and C in the ratio in which they occur in the feed mixture.

I have found that by operating under the above stated conditions, I am able to recover the component B by operation of only one column in any desired and predetermined state of purity as a bottom product. The purity of the bottom product will depend upon the degree of rectification which is effected by the column, and it is understood that my invention is not restricted to a process for producing B completely pure.

The purity of B in the bottom product is also influenced by the degree of equality achieved between the ratio of A to C in the feed and in the top product. Increasing the ratio of A to C in the top product over the corresponding ratio in the feed has the effect of increasing the percentage of the component C in the bottom product, and decreasing the ratio has the effect of increasing the percentage of the component A in the bottom product. Generally, if subjected to a sufficient degree of rectification only one of the components A and C will occur in the bottom product consisting predominantly of B, so that it follows that my process may be operated to obtain B in any desired degree of purity.

A large number of separating agents may be employed as the component C, and these may have vapor pressures which are either higher or lower than or the same as the vapor pressure of either of the components A and B, the selection being made on the basis of the practical economy of the system. If a separating agent having a high vapor pressure is chosen, rectification is easier, but the overhead mixture would generally contain reduced concentrations of A, so that relatively larger amounts of the separating agent must be recycled as secondary or added reflux or introduced at an intermediate level into the column, as with the feed, in order to maintain the proper composition relationship between the top product and the feed. On the other hand, although it is often possible to use a higher boiling separating agent in lesser quantities, it is more difficult to fractionate such a mixture, thereby often necessitating the use of a higher fractionating column and/or higher reflux ratio. My invention may, however, be operated with separating agents of either of these two and any intermediate type. Moreover, the separating agent may often be introduced into the distilling column in the vapor form, thereby permitting the selection of substances which may boil substantially below the boiling point of the mixture being separated.

In accordance with my invention I may use as separating agents many selective solvents, which may or may not be suitable in ordinary solvent extraction processes. For example, I may use solvents which do not possess sufficiently selective properties to effect the desired degree of separation, or which, although sufficiently selective, possess such solvent characteristics as to be useless for liquid solvent extraction purposes.

While the invention is capable of embodiment in many different forms, for purposes of illustration there will hereinafter be described only certain forms thereof, and while it is capable of being carried out in many different kinds of apparatus, only a limited number of them are shown in the accompanying drawing, it being understood that the forms described and the apparatus illustrated are exemplary only.

In the drawing:—

Figure 1:
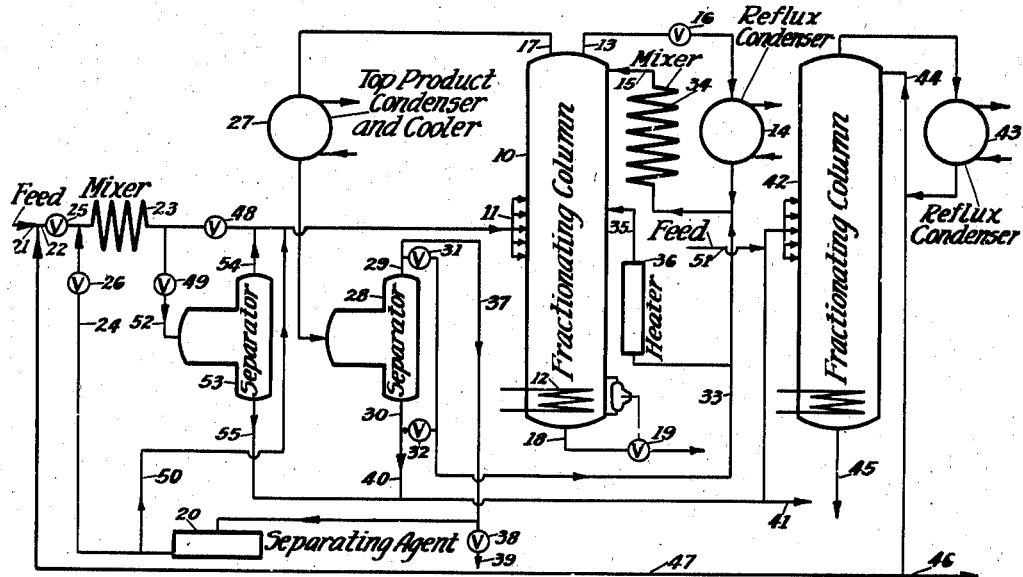
Figure 1 illustrates one schematic form of apparatus and a flow diagram which may be utilized in connection with the invention.

Referring to Figure 1, 10 is a fractionating column, provided with an intake manifold 11, heating element 12, reflux take-off 13, reflux condenser 14 and reflux return line 15 and with the necessary plates above and below the inlet. A valve 16 may be provided to maintain the proper amount of reflux. This valve may, if desired, be operated automatically, as by a thermostat or a pressure responsive device located in the fractionating system. The top product may be withdrawn either from the condensate leaving the condenser 14 or from a separate outlet 17, and the bottom product is withdrawn at 18 at a rate which may be governed by a float controlled valve 19.

A feed mixture consisting of components A and B, is introduced at 21, flows through line 22, and mixer 23 where it is mixed with C introduced through conduit 24. This feed may contain A and B in any ratio although it may be economical to concentrate initially one with respect to the other as, for example, by solvent extraction or by ordinary methods of rectification. Thus, the feed will frequently be a constant boiling mixture of A and B. A supply of separating agent C, which is a preferential solvent for B, is provided at 20. Valves 25 and 26 are provided to maintain a desired ratio of feed to separating agent. Valve 48 being open and valve 49 closed, the mixture is introduced into the column 10. The overhead from 17 is cooled and/or chilled in a condenser 27 and introduced into the settling tank or phase separator 28 at a temperature at which the mixture of A and C will separate into two liquid phases. Assuming that the phase consisting mainly or totally of C is lighter than the other phase, it is withdrawn at 29 and the complementary heavy phase consisting mainly or totally of A is withdrawn at 30. The top product, i. e., the sum of the liquids from 37 and 40 which is removed from the system, must contain A and C in the same ratio as they occur in the feed introduced at 11, and the remaining portion of these products must be returned to the column 10 in the form of a secondary reflux. By adjusting the valves 31 and 32 the separated phases withdrawn from the phase separator 28 can be divided into a top product of the desired composition and quantity, which is withdrawn through the conduits 37 and 40, and a secondary reflux, which is returned to the column 10 through the conduit 33 and introduced either with the main reflux, for instance, after being mixed therewith in mixer 34, or separately at any desired point in the column, as through a conduit 35. It may, if desired, be first heated by a heater 36 to bring it to the temperature of the column at the point of introduction. The remaining portion of the phase which is rich in C may be returned directly through the conduit 37 to the storage 20, or may be withdrawn through a valve 38 and outlet 39 for further processing, while the remainder of the phase rich in A may be withdrawn through a conduit 40 and discharged at 41 or subjected to further treatment as hereinafter described. The component B is withdrawn from the column at 18.

With substantially constant rate of feed of an A+B mixture through the valve 25 and of C through the valve 26, a feed having a constant A to C ratio equal to X is introduced at 11. It should be noted that the liquid flowing through the conduit 24 will often not consist of C in a pure state, but may contain the phase withdrawn at 29. The column may be operated at any desired pressure, either below, at, or above atmospheric. The liquid on one or more plates in the top of the column may often be of such compositions that at temperatures there prevailing two liquid phases will appear, but often total miscibility obtains.

As stated above, I may maintain the correct ratios of A and C in the feed and in the top product by either of two methods. According to the first method the system of control is as follows:

For the given pressure, a vapor of a definite and substantially constant composition will be withdrawn at 17, which will contain components A and C in a certain ratio equal to Y, which will not, save in a fortuitous case, equal X. It is, however, essential that the composite top product to be withdrawn, (i. e., the aggregate of the products withdrawn through conduits 37 and 40) contain A and C in the ratio of X and that the correct amount of top product be withdrawn. Accordingly, either valve 31 or 32 may be opened to return as much of either A or C to the column as is necessary to cause the unreturned portion to be of the desired composition and amount. Under this condition the component B may be withdrawn at 18 in substantially pure state, provided of course the column is capable of a sufficient degree of rectification.

It should be noted that it is possible to operate with both valves 31 and 32 partially open, thereby increasing the quantity of the reflux. Moreover, the conduit 13 and condenser 14 may be eliminated, and conduit 33 used to carry the total reflux.

According to the second method of operation the system of control is as follows: The valves 25 and 26 are adjusted so that X, the ratio of A to C in the feed, is equal to Y, the ratio of A to C in the overhead mixture. In this situation the valves 31 and 32 remain closed and the phase separator 28 may be used to facilitate separating A, B and C from the overhead mixture or the phase separator 28 may be entirely eliminated. Under these conditions the product withdrawn at 18 may, likewise, consist substantially only of B, provided, of course, the column is capable of a sufficient degree of rectification.

These modes of controlling the top product composition, or of adjusting the amount of separating agent C in the feed normally necessitate frequent analyses of the products, due to unavoidable variations in the feed composition and variations in the fractionating column. I have found that in practice this can, in many instances, be avoided by an experienced operator by noting the temperature of the column. If the column is provided with a plurality of temperature measuring devices at different levels it is preferable to select one at which the temperature changes, and to note the proper temperature when the proper operation prevails. With a constant rate of feed of heat input, and of reflux, a variation in the temperature will immediately appraise the operator that the valves 31 and 32 must be adjusted to establish the proper composition relationship.

It should be noted that it is not always necessary to add the third agent as a separate initial material to the feed mixture. Numerous ternary or higher mixtures contain substances which possess selective solvent properties with respect to the other components of the mixture, and may be fed directly into the column 10, and the separating agent may be recovered at 39. If this substance is present in the feed mixture in too low a concentration for effective separation, this concentration may be increased by further addition of this substance, either from an outside source, or by recycling a portion of the final product, as through the conduit 24.

An example of such a mixture is the system: Secondary butyl alcohol—water—"light polymers", as manufactured by hydrolysis of butyl sulfate. In the process of my invention, the light polymers act as the separating agent, and pure alcohol is withdrawn at 18. By recycling the light polymers in a continuous process of my invention the necessary quantity can be accumulated in the system, or additional polymers may be introduced together with the feed.

The overhead mixture from the column 10 will often contain varying amounts of B, depending upon the degree of rectification effected within the fractionating column and upon the composition of azeotropes containing B, if these are produced. This component B will be distributed between the two phases formed in the tank 28, and the portion which enters the phase rich in C will be returned to the system through 33 and 24.

The phase which is withdrawn at 40 will normally consist predominantly of A, but may contain certain amounts of B and, at times, of C, depending upon the mutual solubilities of A, B and C at the temperature of the condenser 27, so that a special provision may be needed to recover B and/or C from this phase, if justified by economic considerations. When this phase contains little or no C, and the vapor pressures of A and B are such that an A+B mixture containing B in a more concentrated form can be obtained by ordinary fractionation methods, this recovery may be readily accomplished by feeding this phase into a fractionating column 42 provided with a reflux condenser 43 and a reflux return line 44. A concentrate of the component A, and a mixture containing B in a more concentrated form are withdrawn at 45 and 46, respectively, and the latter may be returned to the feed in the conduit 22 through a conduit 47.

Figure 2:
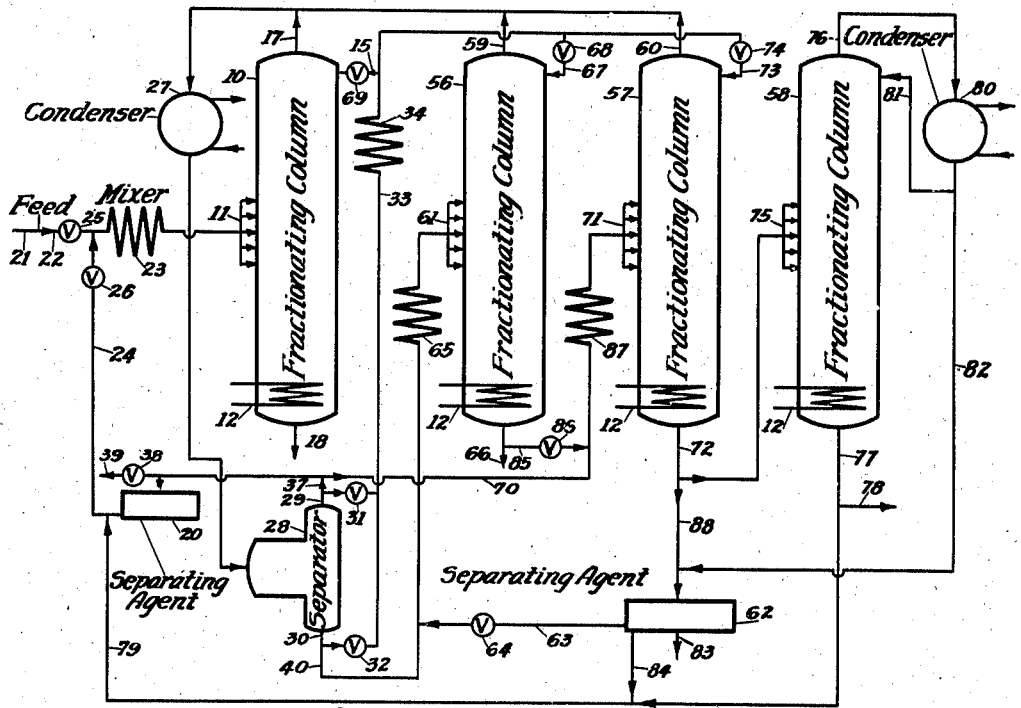
Figure 2 is an illustrative modification of Figure 1 wherein the top product is treated to recover one or more components in a pure state.

When larger amounts of C are present in the liquid flowing through the line 40, recourse is preferably had to the recovery system described later in connection with Figure 2.

In many processes of this nature it is possible to subject the feed mixture to a preliminary treatment to effect an initial concentration of one of the components, whereby the main distillation process may be operated under a lighter load. As suggested above, the feed will frequently be a constant boiling mixture of A and B or a mixture containing B in the highest concentration economically attainable by ordinary fractionation methods. For example, aqueous alcohol may be concentrated by a preliminary distillation. It is, moreover, possible to employ the column 42 for this purpose, as by introducing the initial feed at 51 instead of at 21.

It is, further, often feasible to concentrate such mixtures by a preliminary solvent extraction with a suitable selective solvent, or by "salting out" processes, which are well known in the art. These processes often concentrate B beyond its concentration in the constant boiling mixture.

The separating agent C may often be used as the selective solvent for a preliminary extraction. The step of concentrating the component B by solvent extraction with the solvent C may be incorporated into my process by closing the valve 48 and opening the valve 49, thereby introducing the feed through a conduit 52 into settling tank or phase separator 53; the temperature should be adjusted to cause stratification of the mixture into two phases in this tank. For efficient extraction the separating agent C should preferably possess a high degree of immiscibility with A. Under these conditions, an "extract" phase containing a large amount of C and containing B and A in a greater ratio than in the feed, may be withdrawn at 54 and introduced into the fractionating column, while a raffinate phase having a relatively high concentration of A and a small amount of B may be separated at 55 and withdrawn as a product, or introduced into the conduit 40 for recovery of its content of B in the column 42. In certain systems, (e. g., water,-alcohol,-pentane) substantially no C will occur in the product withdrawn at 55 and 30, but when the agent C is not totally immiscible with A (e. g., in the system di-isopropylmethane-benzene-sulfur dioxide) a certain amount of C will occur in these products. In some cases the raffinate phase from 53 may also be subjected to a distillation in accordance with my invention. An additional quantity of solvent C may be added through line 50.

In place of the mixer 23 and tank 53 I may employ a single- or multi-stage countercurrent extraction treater, or any other suitable extraction apparatus, which may employ a backwash or a temperature gradient, or any other aid for achieving the efficient concentration of B.

It should be noted that when the preliminary extraction unit is used, the ratio of A to C in the top product must be regulated with reference to the ratio of A to C in the phase which is introduced into the column, and not that in which these components are present in the mixer 23.

Although I have described a continuous mode of operation, it should be noted that my process may be applied to batch operations as well.

My invention is not limited to the treatment of mixtures containing only two components besides the separating agent, but may be applied to the separation of quaternary and higher systems, i. e., systems consisting of three or more elemental or composite components in addition to the separating agent, which may itself consist of a single substance or a group of similar substances which are equivalent for the purposes of the process, and which may or may not be initially present in the mixture. In such systems the component(s) B can be recovered in a pure state or in a predetermined state of purity as the bottom product by adjusting the ratio of the other components in the top product to be equal to the corresponding ratio in the feed.

Consider, for example, a mixture of three components A, B and D and a selective solvent C, in which A has the lowest and B has the highest distribution ratio between the selective solvent C and the mixture of A+B+D. As has been stated above, if such a mixture is introduced into a distillation column, in order to obtain B in a substantially pure state, it is necessary to produce in the process a top product wherein the ratio of A:D:C is substantially the same as that in the feed mixture. As already explained, this may be effected by adjusting the composition of the feed mixture or by condensing and cooling the overhead mixture to form two liquid layers from which the top product may be compounded. This overhead mixture may or may not be a ternary or quaternary azeotrope.

The proportions of A, C and D in the feed mixture may be defined by letting $X_1$ represent the ratio of A to C, and $X_2$ represent the ratio of A to D. The lowest boiling material in the system i. e., the material which will distil off first, may be a ternary azetrope containing, for example, A, C and D, but may be a quaternary azeotrope containing A, B, C and D. In any of these overhead mixtures, let the ratio of A to C be designated as $Y_1$ and that of A to D as $Y_2$. Then, in order to obtain substantially pure B as the bottom product, $Y_1$ and $Y_2$ must be substantially equal to $X_1$ and $X_2$, respectively. If the overhead vapor mixture happens to satisfy this requirement for the composition of the top product, a portion of it may be withdrawn even prior to the condensation of the vapor mixture, the remaining portion being used as reflux. Such a relationship will, however, not be commonly encountered and it becomes necessary to produce the desired top product by withdrawing from the overhead mixture a portion which has the desired composition, and return the remaining portion of the overhead mixture to the column as a secondary or added reflux, at any desired level of the column.

Either of these azeotropes can be separated into two portions, of different compositions by cooling and/or chilling the overhead, and separating these portions. By recombining them in the proper proportions a top product of any desired intermediate composition can be produced. If one of these possible compositions contains A, C and D so that A and C are present in the ratio $X_1$ and A and D are present in the ratio $X_2$, substantially pure B can be withdrawn from the bottom of the fractionating column by withdrawing the said composition as top product, and returning the remaining portion of the overhead to the column at any desired level.

If none of these possible combinations of the separated phases corresponds to the required top product composition, the required composition relationship can often be completely attained or closely approximated by adjusting the composition of the feed mixture. If this is impracticable and the said overhead mixture was a quaternary azeotrope, pure B can not be produced. If, however, it is a ternary azeotrope, (and this is the more usual situation) it is possible to raise the temperature of the fractionating column so as to form a higher boiling overhead mixture. By properly regulating the operating conditions of the fractionating column the composition of this mixture can be controlled in a fortuitous case, to have the desired top product composition, i. e., have $Y_1$ and $Y_2$ equal to $X_1$ and $X_2$, respectively, but will generally have to be cooled and/or chilled, separated into two liquid phases of different composition, which are recombined to form a composite top product containing A and C in the ratio of $X_1$ and A and D in the ratio of $X_2$.

If the feed composition is such that the desired values of $X_1$ and $X_2$ can not be attained by the regulation of the top product composition in the manner described above, then either the feed composition has to be changed or pure B can not be withdrawn as bottom product. It is, however, yet possible to obtain B in a constant degree of purity by maintaining a constant top product composition. It may, moreover, be possible to recover pure D as a bottom product, by withdrawing as top product a composition containing A, B and C in the ratio in which they occur in the feed.

In many systems it is possible to obtain by continuous or batch distillation as a bottom product either B or D at will, or any desired mixture containing substantially only B and D. In this case the only requirement is that $Y_1$ equal $X_1$, since whenever the ratio of the component having the lowest distribution ratio and the solvent is the same in the top product as in the feed, the bottom product may be substantially free from said component having the lowest distribution ratio and from the separating agent or solvent. The degree of freedom from these components depends upon the degree of rectification effected in the column.

Higher systems may be similarly fractionated according to my invention, provided that it is possible to adjust the feed and the top product compositions to contain all components except that one or that group of components which are desired as bottom product in the same ratio. For example, in a five component system A, B, C, D, E, if it is desired to obtain as a bottom product a mixture containing only two components B and E, the top product is made to contain A, C, and D in substantially the same ratios as they occur in the feed, while the components B and E must be present in the same top product in lesser proportions. These systems may be treated in the apparatus which has been described in detail in connection with the ternary system.

Numerous changes and modifications may be made in my process, without departing from the spirit and scope of the invention, and my method of fractionation may be used repeatedly in one process in a manner to effect a substantial economy of operation and/or investment and conservation of the desired components of the mixture and of the separating agent. This is especially useful in a situation in which the phase withdrawn at 40 contains substantial quantities of the component C. Such a process is illustrated in Figure 2, in which reference characters 10, 11, 12, 15, 17, 18, 20 to 34, and 37 to 40 designate elements similar to elements designated by the same reference numbers in Figure 1. In the process illustrated in this figure either one, two or three additional fractionating columns 56, 57 and 58 may be provided, as hereafter described. These columns may each be provided with the conventional reflux condensers and return lines, similar to the condenser 14 of Figure 1, but not shown in this figure, or the columns 10, 56 and 57 may be operated by using only the condensate from the overhead lines 17, 59 and 60 as the reflux. The apparatus system may, further, be provided with a preliminary extraction unit, and the feed may have been initially concentrated as was explained above. The column 10 is operated so as to discharge the component B in any desired state of purity by properly adjusting the valves 31 to 32 to withdraw a top product of the desired composition and to return the remaining portion of the overhead mixture to the column 10 by a conduit 15.

In accordance with this embodiment of the invention, the phase withdrawn at 40 is fed into the column 56 at 61. This phase contains both A and B. When it also contains appreciable amounts of C, A may yet be obtained in any desired degree of purity as a bottom product withdrawn through 66, if the temperature of the column 56 be very carefully regulated to remove through a conduit 59 an overhead mixture of such composition, that the total overhead contains B and C in the same ratio as these components occur in the feed at 61.

Another method of operation may consist of mixing the phase withdrawn through 40, prior to its introduction into the column 56 with a diluent which consists of substantially pure C and is introduced from a source 62 by a conduit 63 through a valve 64 and mixer 65. An extraneous and equivalent substance, or a mixture of A, B and C containing very little or no B, may be used instead of the solvent C. This diluent should be added in such proportions that the ratio of B to C in the composite feed is equal to the ratio in which these components occur in the top product withdrawn from the column 56. When a portion of the overhead mixture is taken off as top product this ratio will correspond to the B to C ratio in the ternary azeotrope. Under these conditions substantially pure A may be withdrawn at 66 and an overhead containing A, B and C withdrawn at 59, condensed, and a portion withdrawn as top product, in a manner not shown in the drawing.

When the composition of the overhead mixture in 59 is the same as that in 17, e. g., when a ternary azeotrope is formed at top of the columns 10 and 56, it is not necessary to provide a separate reflux condenser, for it becomes possible to feed both mixtures into the same condenser 27, as shown, and to return a portion of the reflux in the conduit 33 to the column 56 through a conduit 67 and valve 68. This arrangement effects a substantial saving in the installation, but necessitates several modifications in the mode of operation: (1) Since the conduit 33 now carries reflux for more than one fractionator, a valve 69 must be provided to return the proper quantity of reflux to this column. (2) Since the composition of the top product of the column 56 is now no longer the same as that of the natural overhead, a different quantity of diluent must be admitted from the source 62 by changing the position of the valve 64.

It is, moreover, possible to recover substantially pure C by fractionating the product contained in the conduit 37, as by feeding all or a portion of it through a conduit 70 and manifold 71 into the column 57. This feed will consist predominantly of C and contain lesser amounts of A and B. Except when conditions in the column are very carefully controlled, as described above in connection with the operation of column 56, it is not possible to get pure C as bottom product. Without a proper control, a mixture of B and C usually will be obtained as bottom product and withdrawn at 72, and an overhead mixture containing A, B and C withdrawn at 60, and condensed separately in a manner not shown. When the composition of this overhead mixture is the same as that which is produced in the column 10, it may be treated together with the mixture from 17, as explained above, and the reflux returned through a conduit 73 and a valve 74.

The B+C mixture from 72 may be further fractionated to produce substantially pure C and/or B. If an azeotrope B+C is formed, only one of the components B+C may be obtained in a pure state. The fractionation may be effected by introducing this mixture into the column 58 through a manifold 75 and withdrawing, for example, substantially pure C at 76, and B, or B in a concentrated form, at 77. The latter may be withdrawn at 78 as a separate product or returned to the system through a conduit 79. The overhead from 76 may be cooled in a condenser 80 and a portion of the distillate returned through 81 as reflux, while the remaining portion is withdrawn through a conduit 82, stored in the storage 62, and used as a diluent in the column 56, or withdrawn as a product at 83. It is, moreover, possible to fractionate substantially all of the product flowing through the conduit 37 and to use substantially pure separating agent from the storage 62 at the feed diluent, as by flowing it through a conduit 84.

It is, further, possible to eliminate the column 58 and to produce substantially pure C in the column 57 by operating it in accordance with my invention. To produce pure C as bottom product the feed must contain A and B in the same ratio as it is in the top product, it being observed that the top product is not necessarily the same composition as the overhead, as explained above in connection with the operation of the column 56 when employing a single condenser 27. The composition of the feed can be readily controlled by adding to the product flowing through the conduit 70 the proper quantity of A, as by withdrawing a portion of the bottom product from 66 through a conduit 85 and valve 86, and mixing it with this product in a mixer 87. Under these conditions substantially pure C can be withdrawn at 72 and led to the storage 62 through a conduit 88.

The above process may be applied to the separation of a wide variety of mixtures. A few examples of mixtures which may be separated according to the above described process are given below, but it is understood that my invention is not limited thereto:

Organic compounds containing water may be dehydrated by my process. Thus alcohols, esters, aldehydes, ketones, or the like, may be mixed with a separating agent and distilled. Butane, pentane, furfural, aniline, glycerine, ammonia, $SO_2$, alcohols, ketones, aldehydes, amides, nitriles and a large number of other selective solvents which are preferential solvents for the substance being dehydrated, as, for example, those enumerated on page 116 of J. Hildebrand's book on "Solubility", 1924, may be used as separating agents. In all of these systems components preferentially soluble in the solvent may be recovered in any desired state of purity as the bottom product, and the less soluble components may be withdrawn in and from the overhead mixture.

Organic compounds may be separated from impurities or from other compounds in a manner similar to the above described dehydration process. For example, benzene and cyclohexane, may be separated, using aniline as a separating agent, the substantially pure benezene being obtained as a bottom product.

Hydrocarbons which are soluble in concentrated sulfuric acid may be separated from their mixtures with hydrocarbons which are insoluble in said acid by distilling such a mixture in the presence of a separating agent which is a selective solvent for the former hydrocarbons, and controlling the composition in the manner described above. For example, butylene may be separated from butane using ammonia as the separating agent. Such hydrocarbon mixtures will frequently contain a number of hydrocarbons of each type, so that either or both of the components A and B may consist of a plurality of subcomponents. Such a mixture of subcomponents may be treated as one component and the mixture fractionated according to my invention as a two component mixture. For example, a mixture of paraffins and olefines boiling between 180° C. and 240° C. may be fractionated, using furfural as a separating agent, substantially pure olefines being obtained at 18 and a top product of paraffin, furfural and no or lesser amounts of olefines being obtained as the top product. When the initial mixture has a wide boiling range substantially pure olefines may still be secured at 18, but substantial quantities of the lower boiling olefines may appear in the top product. To avoid this, the initial mixture may be split into narrower fractions by a preliminary fractionation and each fraction may then be separated in accordance with my process. Mixtures having wide boiling ranges may also be fractionated in one operation by employing separating agents having boiling temperatures which are low enough to cause its low boiling mixture with all of the constituents of the component which it is desired to separate as overhead to boil below the lowest boiling constituent of the component which it is desired to withdraw as bottom product. For example, a mixture of paraffins and olefines boiling between 150° C. and 230° C. may be treated according to my invention, using BB' dichloroethyl ether as the separating agent, since all of the paraffins will form low boiling compositions with the separating agent boiling below 150° C. In the same manner, aromatic hydrocarbons may be separated from paraffinic hydrocarbons, using furfural or other similar selective solvents as separating agents. These applications are especially useful in the production of high grade gasolines, kerosenes and lubricating oils.

The above examples relate to ternary systems or to systems which, for the purposes of my invention, may be regarded as being ternary systems. The following are a few of the quaternary systems which may be fractionated in accordance with my invention, the separating agent being counted as the fourth component.

A mixture of secondary butyl alcohol, methyl ethyl ketone and water may be distilled using pentane as the separating agent. Depending on the feed composition and on the manner of operation, either secondary butyl alcohol in any predetermined degree of purity, or methyl ethyl ketone in any predetermined state of purity, or a mixture of the two may be recovered as bottom product.

In a similar manner the system: Secondary butyl alcohol—methyl ethyl ketone—water—"light polymers" may be fractionated either with or without the further addition of further quantities of separating agent, such as pentane. When no pentane is added the light polymers act as the separating agent.

I claim as my invention:

1. A process for fractionating a distillable mixture of a plurality of components having different distribution ratios between a selective solvent and the said mixture, said solvent being adapted to form two liquid phases when contacted with a component having a lower distribution ratio than another component, comprising introducing a feed mixture containing said liquid mixture and said solvent into a distilling apparatus, determining the ratio of the solvent and the component having the lowest distribution ratio obtaining in the feed mixture, fractionating said feed in said distilling apparatus to produce a bottom product and an overhead mixture, the ratio of the solvent to the component having the lowest distribution ratio in the overhead mixture being different from the corresponding ratio in the feed mixture, continuously withdrawing and cooling at least a portion of said overhead to cause it to separate into two phases of different compositions, withdrawing portions from each of the said phases in the proper proportion to produce a top product containing the solvent and the component having the lowest distribution ratio in substantially the said determined ratio, and continuously returning the residual portion of the said phases to the distillation apparatus.

2. In the process of separating a component from a distillable mixture of several components, the steps of rectifying the mixture together with a selective solvent for the said component adapted to form two liquid phases when contacted with another of said components in a distillation zone withdrawing vapors formed within the zone derived from the combined mixture, cooling at least a part of said vapors outside the zone to cause their condensation and separation of the condensate into two liquid phases, withdrawing all of one of said phases, together with a portion of the other phase, as a top product wherein the ratio of concentrations of the solvent and one component other than the preferentially soluble one is substantially the same as the ratio of concentrations of the solvent and the same component in the said combined mixture, continuously returning the remaining portion of the latter phase to the distillation zone, and separately withdrawing a bottom product containing the preferentially soluble component.

3. In the process of separating a component from a distillable mixture of two components, the steps of rectifying the mixture together with a selective solvent for the said component adapted to form two liquid phases when contacted with the other component in a distillation zone, continuously withdrawing vapors formed within said zone derived from the combined mixture, cooling at least a part of said vapors outside the zone to cause their condensation and separation into two liquid phases, one of said phases being a solvent phase, and the other consisting predominantly of the component which is not preferentially soluble in the solvent, withdrawing from both of the phases a top having a composition different from the said overhead mixture and product wherein the ratio of the concentrations of the solvent and the component not preferentially soluble is the same as the corresponding ratio in the said combined mixture, continuously returning the remaining condensate to the distillation zone, and separately withdrawing a bottom product containing the preferentially soluble component.

4. A process for fractionating a distillable mixture of a plurality of components having different distribution ratios between a selective solvent and the said mixture, said selective solvent being adapted to form two liquid phases when contacted with a component having a lower distribution ratio than another component, comprising introducing a feed mixture containing said liquid mixture and said solvent into a first distilling apparatus, fractionating said feed mixture in said distilling apparatus to produce a bottom product and an overhead mixture consisting of a substantially pure azeotrope containing at least the solvent and the component having the lowest distribution ratio, continuously withdrawing the overhead mixture from the apparatus, condensing and cooling at least a portion of the withdrawn overhead mixture outside the apparatus to cause its condensation and separation into two liquid phases, one of said phases containing the said solvent in a high concentration, and the other phase being poor in the said solvent, withdrawing portions of both separated phases in the proper proportions and amounts to produce a top product containing the solvent and the component having the lowest distribution ratio in substantially the same ratio as they occur in the feed mixture, and returning the residual portion of the withdrawn overhead mixture to the distillation apparatus.

5. A process for fractionating a distillable mixture of a plurality of components having different distribution ratios between a selective solvent and the said mixture, said selective solvent being adapted to form two liquid phases when contacted with a component having a lower distribution ratio than another component, comprising introducing a feed mixture containing said liquid mixture and said solvent into a first distilling apparatus, fractionating said feed mixture in said distilling apparatus to produce a bottom product and an overhead mixture, continuously withdrawing the overhead mixture from the apparatus, condensing and cooling at least a portion of the withdrawn overhead mixture outside the apparatus to cause its condensation and separation into two liquid phases, one of said phases containing the said solvent in a high concentration, and the other phase being poor in the said solvent, withdrawing portions of both separated phases in the proper proportions and amounts to produce a top product containing the solvent and the component having the lowest distribution ratio in substantially the same ratio as they occur in the feed mixture, returning the residual portion of the withdrawn overhead mixture to the distillation apparatus, fractionating at least some of the solvent-poor phase comprised in the top product in a second distillation apparatus to produce a distillation product containing a component having a higher distribution ratio than at least one other component in a more concentrated form and returning at least a portion of this distillation product as a part of the feed to the first distillation apparatus.

6. A process for fractionating a distillable mixture of a plurality of components having different distribution ratios between a selective solvent and the said mixture, said selective solvent being adapted to form two liquid phases when contacted with a component having a lower distribution ratio than another component, comprising contacting said mixture with said selective solvent under conditions causing the formation of two liquid phases, one of said phases being relatively poorer in the solvent, and the other phase being relatively richer in the solvent, introducing the latter phase as a feed mixture into a distillation apparatus, fractionating said feed mixture in said distilling apparatus to produce a bottom product and an overhead mixture, continuously withdrawing the overhead mixture, condensing and cooling at least a portion of the withdrawn overhead mixture outside the apparatus to cause its condensation and separation into two liquid phases, withdrawing portions of both separated phases in the proper proportion and amounts to produce a top product containing the solvent and the component having the lowest distribution ratio in substantially the same ratio as they occur in the said feed mixture, and returning the residual portion of the withdrawn overhead mixture to the distillation apparatus.

7. A process for fractionating an initial distillable mixture of two components having different distribution ratios between a selective solvent and the said mixture, said selective solvent being adapted to form two liquid phases when contacted with a component having a lower distribution ratio than another component, comprising introducing a feed mixture containing the said mixture and the said solvent into a first distilling apparatus, fractionating said feed mixture in the first distilling apparatus to produce a bottom product and an overhead mixture, continuously withdrawing said overhead mixture from the distillation apparatus, condensing and cooling at least a portion of the said overhead mixture to cause it to separate into two liquid phases, one of said phases containing the solvent in a higher concentration, and the other phase containing the solvent in a lower concentration, withdrawing a top product from the said separated phases, in such proportions that the ratio of the solvent to the component having the lower distribution ratio will be the same in the withdrawn top product as in the said feed mixture, introducing a second feed mixture containing at least a portion of the withdrawn top product consisting predominantly of the said liquid phase containing the solvent in a lower concentration and an added quantity of the said solvent into a second distilling apparatus to produce a bottom product containing the component having the lower distribution ratio in a concentrated form, and a second overhead mixture, withdrawing said second overhead mixture and condensing it together with the first overhead mixture, using portions of the combined condensate as refluxes for each of said distilling apparatus and adjusting the added quantity of selective solvent in the second feed mixture so that the second feed mixture contains the said solvent and the component having the higher distribution ratio in substantially the same ratio as they occur in the top product.

PETRUS JURJEN ROELFSEMA.